United States Patent [19]

Siol et al.

[11] Patent Number: 5,237,011
[45] Date of Patent: Aug. 17, 1993

[54] COMPATIBLE POLYMER MIXTURES OF POLYSTYRENE AND POLYCYCLOPENTYL (METH)ACRYLATE

[75] Inventors: Werner Siol, Darmstadt; Ulrich Terbrack, Reinheim, both of Fed. Rep. of Germany

[73] Assignee: ROHM GmbH Chemische Fabrik, Darmstadt-Eberstadt, Fed. Rep. of Germany

[21] Appl. No.: 684,193

[22] Filed: Apr. 12, 1991

[30] Foreign Application Priority Data

Apr. 12, 1990 [DE] Fed. Rep. of Germany ....... 4011802

[51] Int. Cl.$^5$ .................. C08L 45/00; C08L 27/12; C08L 35/00
[52] U.S. Cl. .................... 525/216; 525/191; 525/199; 525/205; 525/207; 525/227; 525/241; 428/373
[58] Field of Search ............... 525/191, 216, 241, 207, 525/205, 199, 227; 428/373

[56] References Cited

U.S. PATENT DOCUMENTS

| | | | |
|---|---|---|---|
| 4,898,912 | 2/1990 | Siol et al. | 525/931 |
| 4,912,169 | 3/1990 | Whitmire et al. | 525/216 |
| 5,008,341 | 4/1991 | Bueschl et al. | 525/227 |
| 5,047,481 | 9/1991 | Siol et al. | 525/216 |
| 5,063,112 | 11/1991 | Gross et al. | 525/148 |

*Primary Examiner*—John Kight, III
*Assistant Examiner*—T. Mosley
*Attorney, Agent, or Firm*—Oblon, Spivak, McClelland, Maier & Neustadt

[57] ABSTRACT

Compatible polymer mixtures (polymer blends) comprised of polymers of a cyclopentyl (meth)acrylate and a styrene.

47 Claims, 1 Drawing Sheet

COMPATIBLE POLYMER MIXTURES OF POLYSTYRENE AND POLYCYCLOPENTYL (METH)ACRYLATE

BACKGROUND OF THE INVENTION

1. Field of the Invention

The invention relates to compatible mixtures (polymer blends) of a polymer containing cyclopentyl (meth-)acrylate as a monomer and a polymer containing styrene, as a monomer.

2. Discussion of the Background

As a rule, different polymer species are incompatible i.e. they do not form a homogeneous phase except at very low concentrations of one species. A homogeneous phase is characterized by complete miscibility of the components.

Certain exceptions to this rule have become increasingly important, particularly among persons concerned with the theoretical aspects of the phenomenon. Completely compatible mixtures of polymers display complete solubility (miscibility) in all mixture ratios.

A comprehensive discussion of compatible polymer systems is found in, e.g., Paul, D.R., et al., 1978, Polymer & Engineering Science, 18, 16:1225-34; 1980, J. Macromol. Sci. Rev. Macromol. Chem. C, 18, 1:109-168.

To demonstrate miscibility, the glass temperature $T_g$ is often employed, or the so-called "optical method" (clarity of a film cast from a homogeneous solution of the polymer mixture) is employed (see Brandrup-Immergut, "Polymer Handbook", 2nd Ed., II:211-213). Another test for the miscibility of essentially different polymers is the occurrence of a lower critical solution temperature (LCST) (see DE-A 34 36 476.5 and DE-A 34 36 477.3). The occurrence of an LCST is based on the process wherein, when a previously clear homogeneous polymer mixture is heated, it separates into phases and becomes cloudy to opaque. Accordingly to the literature, this sequence of events represents unambiguous proof that the original polymer mixture was comprised of a single homogeneous phase in equilibrium.

Recent results on polymer blends and their possible applications are reported in Robeson, L.M., Polym. Engineering & Science, 24, 8:587-597. Copolymers of styrene and maleic anhydride, and of styrene and acrylonitrile, are compatible with polymethyl methacrylate (PMMA) (DE-A 20 24 940). The improved application properties of molding compounds of this type are pointed out as important. Also, copolymers of styrene and monomers which contain hydroxyl groups and are favorable to formation of hydrogen bonds are compatible with polymethacrylates at certain ratios; e.g., copolymers of styrene and p-(2-hydroxyhexafluoroisopropyl)styrene (Min, B.Y. and Pearce, E.M., 1981, Organic Coatings and Plastics Chemistry, 45, 58-64), or copolymers of styrene and allyl alcohol (Cangelose, F., and Shaw, M.T., 1983, Polymer Preprints (Am. Chem. Soc., Div. Polym. Chem.), 24, 258-259).

Polystyrene itself and other styrene-containing polymers have been found to be incompatible with PMMA. Thus, Shaw, M.T., and Somani, R.H., 1984, Adv. Chem. Ser., 206 (Polym. Blends Compos. Multiphase Syst.), 33-42 (CA 101:73417e) report a miscibility of only 3.4 ppm of PMMA of molecular weight (m.w.) 160,000 with polystyrene, and only 7.5 ppm of PMMA of m.w. 75,000 with polystyrene. Even very low molecular weight polystyrene is largely incompatible with PMMA. Thus, a mixture of 20% of an extremely low molecular weight styrene oligomer (m.w. 3,100) no longer yields a clear product. With a still very low molecular weight polystyrene (m.w. 9,600), a solution of only 5% in PMMA is no longer transparent but only translucent (Parent, R.R., and Tompson, E.V., 1978, Journal of Polymer Science, Polymer Physics Edition, (Vol. 16, 1829-1847).

Other polymethacrylates and polyacrylates are similarly minimally miscible with polystyrene to form transparent plastics. Such is true of, e.g., polyethyl acrylate (PEA), polybutyl methaorylate, polyisobutyl methacrylate, polyneopentyl methacrylate, polyhexyl methacrylate, and numerous others. (See also Somani, R.H., and Shaw, M.T., 1981, Macromolecules, 14:1549-1554.) On the other hand, mixtures comprised of polymers of cyclohexyl (meth)acrylate and styrene have been found to be compatible (see EP-A-0 268 040).

Thus, polystyrene is compatible with copolymers of methyl methacrylate and/or ethyl methacrylate and alkyl methacrylates with 3-24 carbon atoms in the alkyl group, if the copolymers are comprised of units of ethyl methacrylate and/or methyl methacrylate in the amount of 30-90 wt. % and the $C_3$-$C_{24}$ alkyl methacrylates in the amount of 70-10 wt. % (DE-OS 37 30 025.3). Homopolymers such as PMMA or PEMA or poly($C_3$-$C_{24}$)alkyl methacrylate are not compatible with polystyrene (DE-OS 37 30 025.3).

Certain alkyl-substituted polystyrenes are compatible with certain polyalkyl methacrylates (see DE-OS 36 38 443.7). An example cited in DE-OS 36 38 443.7 is poly-t-butylstyrene and (3,3,5-trimethylcyclohexyl methacrylate). Compatibility of mixtures of polystyrene and poly(meth)acrylic acid esters of substituted heterocycles with 5-8 ring atoms if the heterocycles have at least 2 heteroatoms in the ring has been found (DE-OS 38 18 837.6).

Thus, the art confirms the correctness of the prevailing view of compatible polymer mixtures, namely that incompatibility is the rule and compatibility is the exception, and that the present level of theoretical understanding of the phenomenon of polymer compatibility does not enable reliable prediction.

Mechanical mixtures of polymers (polyblends) have led to plastics products with improved properties in certain areas of the plastics industry (see Kirk-Othmer, 1982, "Encyclopedia of Chemical Technology", 3rd Ed., Vol. 18, pub. John Wiley, pp. 443-478). The physical properties of such polyblends ordinarily represent a compromise, which in general can provide an improvement in the properties over those of the individual polymers.

As a rule, however, it is multiphase polymer mixtures which have achieved commercial importance rather than the few known compatible mixtures (see Kirk-Othmer, loc. cit., pg. 449).

A particularly interesting case of a multiphase polymer mixture is that of mixtures of PVC and/or polystyrene or polycarbonate or SAN, with a graft polymer produced in two steps, comprised of a copolymer of methyl methacrylate in the amount of 10-80 wt. % and an elastomer in the amount of 90-20 wt. %, wherewith the methyl methacrylate copolymer is comprised of units of a cycloalkyl (meth)acrylate in the amount of between 5 and 50 wt. %. All of these mixtures have excellent impact strength (DE-OS 37 43 199.4).

As discussed above, multiphase and compatible polymer mixtures are quite different, in their physical properties and in other properties which have industrial applications, particularly optical properties (transparency, clarity, etc.). Further, the strategy of creating a mixture of plastics to attain an improved overall spectrum of properties is often limited by limits on compatibility. This appeared to be the case for the two polymer classes of polystyrenes and polyalkyl meth)acrylates. (See Kruse, W.A. et al., 1976, Makromol. Chem., 177, 1145; and Somani, R.H., and Shaw, M.T., 1981 Macromolecules, 14, 1549-1554.)

SUMMARY OF THE INVENTION

Accordingly, one object of the present invention is to provide compatible and miscible polymer mixtures having improved optical properties.

It has been surprisingly discovered, in connection with the present invention, that mixtures of polystyrenes and polycyclopentyl methacrylate or polycyclopentyl acrylate are compatible.

The present invention relates to compatible polymer mixtures of two different polymer components, as follows:

A) 0.1–99.9 wt. % of a polymer P1 comprised at least 20 wt. % of monomers of formula I

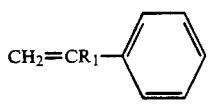

(I)

where $R_1$ represents hydrogen or methyl, and

B) 99.9–0.1 wt. % of a polymer P2 which is a poly(meth)acrylate comprised at least 10 wt. % of monomers of formula II

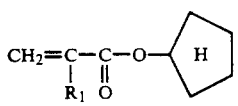

(II)

where $R_1$ represents hydrogen or methyl, and the cyclopentyl group may have substituents in the form of alkyl groups each having 1-4 carbon atoms.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawing, wherein.

DETAILED DESCRIPTION OF THE PREFERRED EMBODIMENTS

Figure 1:
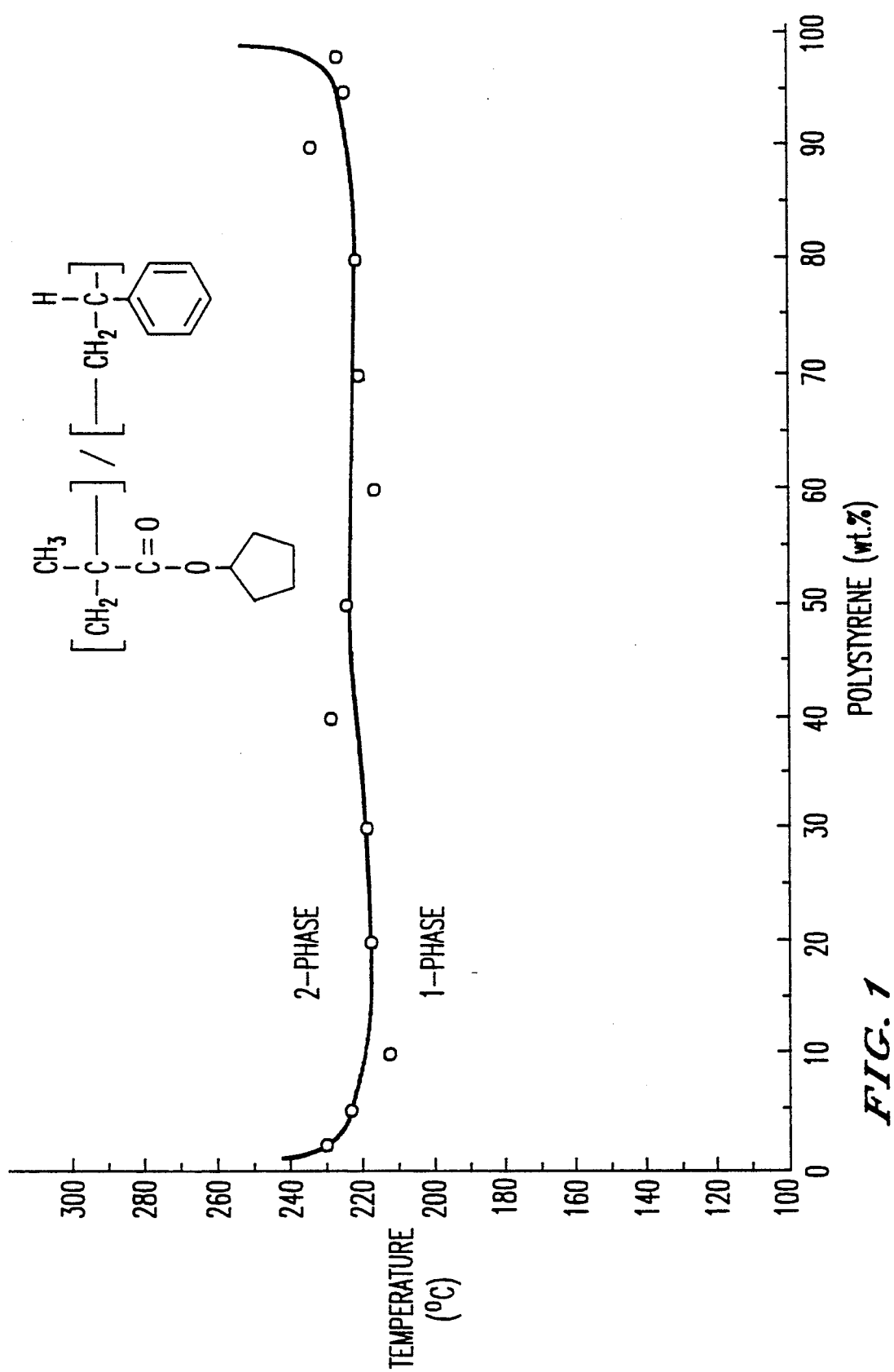
FIG. 1 shows the results of heating the polymer mixtures of the present invention. All mixture ratios resulted in a transparent film which undergoes de-mixing when heated to about 220° C.

Preferably the sum of the amount of polymer components (A) and (B) is 100% of the polymer content of the mixture. In some situations the polymer mixture may be employed in place of a single polymer, e.g. in processing in combination with other polymers.

The compatibility of the inventive mixtures of a polymer P1 (A) and a poly(meth)acrylate P2 (B) could not have been predicted, because there is no generally recognized theoretical basis for compatibility of high polymers. It should be noted that, e.g., polyphenyl acrylates and polyphenyl methacrylates are not at all compatible with polymers P1.

According to the present discovery, the compatibility of mixtures of (A) and (B) is so good that there is no de-mixing at temperatures of 200° C. and above. Particularly noteworthy are polymer mixtures of polystyrene as polymer component (A) and polycyclopentyl methacrylate or polycyclopentyl acrylate, as polymer component (B).

The excellent compatibility of such mixtures enables wide variation in the mixture ratio and the specific mixture partners. This is particularly the case for polystyrene as polymer P1. Thus, it is possible to vary the polymer component (B) widely by polymerization with suitable monomers. It is also possible to vary polymer component (A) within certain limits by copolymerization with suitable monomers, while still having compatibility. Suitable comonomers for component (B) are (meth)acrylic acid esters, in general, such esters of non-alicyclic alcohols with 1-12 carbon atoms, particularly alkanols; (meth)acrylic acid esters of optionally substituted cyclic alcohols with 4, 7, 8, 9, 10, 11, or 12 carbon atoms in the ring; and (meth)acrylic acid esters of substituted cyclohexanols. Particularly important candidates as comonomers are acrylic acid esters with 1-8 carbon atoms, and methacrylic acid esters with 3-12 carbon atoms.

Other monomers which can be copolymerized with cyclopentyl (meth)acrylate are also candidates as comonomers. Thus, methyl methacrylate and ethyl methacrylate are of interest, particularly as comonomers in proportions of 1-29 wt. %. The amount of cyclopentyl acrylate and/or cyclopentyl methacrylate as a proportion of the total content in polymer component (B) is, as a rule, 100-10 wt. %, particularly preferably 95-20 wt. %, and more preferably 80-20 wt. %. Of particular interest are polymers comprising 71-100 wt. % of cyclopentyl (meth)acrylate and 0-29 wt. % of methyl and/or ethyl methacrylate. Also, according to the present discovery one may permissibly mutually substitute allowable monomers according to general formula II and allowable monomers according to general formula III where $R_2$ represents hydrogen or methyl and $R_3$ represents an alkyl group of the formula $C_nH_{2n+1}$, with $n = 1-8$.

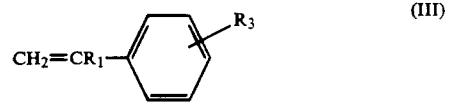

(III)

Thus, according to formula I, styrene may be replaced by alpha-methylstyrene in polymer (A), preferably to the extent of several percent, e.g. 10 wt. %. To a certain extent the styrene can also be replaced by other alkyl-substituted styrenes, such as, e.g., m-methylstyrene, p-tert-butylstyrene, or p-methylstyrene. As a rule the proportion of these monomers is <20 wt. %. The styrene can also be partially replaced by (meth)acrylic acid esters. Also, a small amount of the styrene may be replaced by other vinyl compounds, particularly vinyl esters such as, e.g, vinyl acetate and vinyl propanoate. In such cases, the content of styrene and/or alpha-methylstyrene, in polymer component (A), should be at least 20 wt. %, preferably at least 50 wt. %, particularly preferably at least 90 wt. %, and more preferably at least 99 wt. %. It is particularly preferred for polymer component (A) to be comprised at least 99 wt. % of styrene units. While it is permissible for polymer component (A) to be modified to a major degree by other hydrophobic vinyl compounds, the proportion of very polar monomers, such as, e.g., acrylonitrile, maleic anhydride, maleic acid imides, p-(2-hydroxyhexafluoroisopropyl)styrene or allyl alcohol, is strongly limited; namely to <10 wt. % or preferably <5 wt. % of polymer component (A). Particularly preferred are polymers (A) containing <0.1 wt. % of these polar monomers.

Similarly, in polymer (B) the cyclopentyl methacrylate may be replaced by polycyclopentyl acrylate.

The variations will generally depend on the requirements of the given application. Thus, a polymer (B) will contain a substantial amount of cyclopentyl (meth)acrylate, e.g. to modify the index of refraction of pure polystyrene, the amount being generally >20 wt. %, or preferably >30 wt. %, whereas a polymer (B) for which it is required merely that polymer (B) be compatible with polymer (A) only at room temperature and where it is intended (or permitted) that the mixture undergo phase separation (thus display incompatibility) at elevated temperature, will require less cyclopentyl (meth)acrylate.

As a rule, polymer (A) is compatible with polymer (B), even if polymer (A) contains some cyclopentyl (meth)acrylate and/or polymer (B) contains some styrene. The styrene content of polymer (A) should be substantially higher than that of polymer (B). As a rule, the difference in the styrene contents i.e., wt. % styrene in polymer (A) minus wt. % styrene in polymer (B), is >10 wt. %, preferably >30 wt. %, particularly preferably >50 wt. %, and more preferably >90 wt. %. Also, the cyclopentyl (meth)acrylate content of polymer (B) should be substantially higher than that of polymer (A). As a rule, the amount of cyclopentyl (meth)acrylate in polymer (A) should be <5 wt. %, and preferably <0.1 wt. %. In cases where polymer (A) contains cyclopentyl (meth)acrylate, the quotient $$\frac{\text{Content of cyclopentyl (meth)acrylate in Polymer (B)}}{\text{Content of cyclopentyl (meth)acrylate in Polymer (A)}}$$

should be >2, preferably >5, and particularly preferably >10.

The content of monomers of formula I in polymer P2 and the content of styrene and/or alpha-methylstyrene in polymer P1 may be small if, in particular, the other monomer units in P1 and P2 are chemically similar.

A particularly preferred polymer mixture contains pure polystyrene as polymer component (A) and a polymer with 71-100 wt. % cyclopentyl (meth)acrylate as polymer component (B).

The characterization of the inventive polymer mixtures as compatible is carried out based on the recognized criteria (see Kirk-Othmer, loc. cit., Vol. 18, pp. 457-460):

a) Using optical techniques, the inventive polymer mixtures show a single index of refraction, which lies between the indices of the respective polymer components (A) and (B).

b) The polymer mixtures have a single glass transition temperature Tg, which lies between the glass transition temperatures of the respective polymer components.

Preparation of Polymers

Polymers (A) and (B) may be produced according to the known rules of polymerization, and by known methods. The polymers of type (A) may be produced according to Houben-Weyl, 1961, "Methoden der organischen Chemie, ", 4th Ed., Vol. XIV/1, pub. Georg Thieme-Verlag, pp. 761-841. They are also commercially available in suitable form. Preferably, radical polymerization may be used, but ionic polymerization may also be used. The molecular weights of the inventively employed polymers (A) (determined by light scattering) are, as a rule >3,000, preferably in the range 5,000–1,000,000, particularly preferably in the range 20,000–500,000. It should be emphasized that the molecular weight does not seem to critically affect the suitability as a component in the compatible polymer mixtures. This applies to homopolymers as well as copolymers of types (A) and (B). The tacticity of the polymers has a certain importance in determining the compatibility of polymers P1 and P2. As a rule, a polymer P2 with a small proportion of isotactic triads (achieved, e.g., by radical polymerization) is preferred over polymers with a high isotactic proportion (achieved in special ionic polymerizations).

Known methods are employed to produce the homo- and/or copolymer (B) (see Rauch-Puntigam, H., and Voelker, Th., 1967, Acryl- und Methacrylverbindungen, pub. Springer-Verlag). Although in principle it is possible to employ anionic or group-transfer polymerization (see also Webster, O. W. et al., 1983, J. Am. Chem. Soc., 105, 5706), the preferred method is radical polymerization.

The molecular weights of the polymers (B) (determined by light scattering) are as a rule >3,000, generally in the range 10,000–1,000,000, preferably 20,000–300,000. In selecting the monomer components to be used as comonomers in (B), one should take care that the glass temperature Tg of the resulting polymer does not limit the usefulness of the overall system. Thus, for producing molded bodies from the polymer mixture, at least one of the polymers P1 and P2 should have Tg >70° C., and for such an application it is preferred that the polymer mixture also has Tg >70° C. This is also a preferred requirement in the case of production of injection-molded, pressed, or extruded articles from the polymer mixture. For other applications, e.g. for coatings, elastomers, or reversible thermotropic glazing (polymer mixture with a cloud point upon heating), thus for applications according to DE-OS 34 36 477.3, polymer mixtures are preferred which have a polymer component P2 with glass temperature Tg <40° C., preferably <20° C.

Preparation of the Mixtures (PM)

The compatible mixtures may be produced by various techniques, e.g., by intensive mechanical mixing of components (A) and (B) in the melt, in an extruder, etc.; or they may be produced as so-called "solution cast polyblends" from a common solvent (see Kirk-Othmer, 1982, "Encyclopedia of Chemical Technology", 3rd Ed., Vol. 18, pub. John Wiley, pp. 443-478). Also, one can dissolve polymer (A) in a mixture of the monomers of the other polymer, (B), and then produce (B) in the presence of (A); and vice versa, polymer (A) can be produced in the presence of polymer (B). Also, the polymer mixture can be produced from common precipitation agents. There are no limits on the type of mixing.

As a rule, one first prepares mixtures of components (A) and (B) wherein advantageously one starts with solid polymers in the form of, e.g., beads or granulate, and employs a slowly acting mixing apparatus, e.g. drum, spiral mixing wheel, and/or double-chamber plowshare-type mixer. The slowly acting mixing apparatus produces a mechanical mixture without eliminating phase boundaries (see "Ullmanns Encyklopaedie der technischen Chemie", 4th Ed., Vol. 2, pub. Verlag Chemie, pp. 282-311). Then, the mixture is processed thermoplastically by homogeneous mixing in the melt, using a heatable apparatus at suitable temperatures, e.g., kneader mixers or preferably extruders, e.g. single- or multiple-screw extruders, or possibly extruders with oscillating screws and shear rods (e.g. the BUSSCO kneader) at e.g., 150° C. to about 300° C.

Using this method one can produce uniform-pellets e.g. hot-chopped pellets, cubic pellets, or round pellets. The granule size is in the range 2-5 mm. Another simple method to produce the polymer mixture is to mix a polymer dispersion containing polymer component (A) with a polymer dispersion containing polymer component (B). Such dispersion mixtures can be coagulated together, spray-dried together, or extruded together in an extruder, or they can be dried together to form a film.

Advantageous Properties and Applications of the Mixtures

The inventive compatible polymer mixtures have, in particular, the following advantages which are suggestive of various application possibilities. Hereinbelow, the term "polystyrene" will be used to indicate application possibilities for polymer (A), and "cyclopentyl (meth)acrylate" will be used to indicate application possibilities for polymer (B).

1) The polymer mixtures are compatible, unlike mixtures of other poly(meth)acrylates and polystyrenes. The inventive polymer mixtures in the unpigmented state are highly transparent and colorless, in contrast to noncompatible mixtures of polystyrenes and poly(meth)acrylates; in particular, they do not scatter light, i.e. as a rule their haze is <10%. However, according to the invention such mixtures which are only compatible at room temperature display de-mixing at elevated temperature.

2) Mixtures of polystyrenes and polycyclopentyl (meth)acrylate have low water uptake, as do polystyrenes and polycyclopentyl (meth)acrylates themselves.

3) The birefringence of polystyrene can be reduced by mixing with polycyclopentyl (meth)acrylate. The two previously mentioned properties qualify the inventive polymer mixtures as data storage materials, particularly for optically readable information storage media (see Hennig, J., 1985, Kunststoffe, 75, 425).

4) The index of refraction of polystyrene can be reduced by mixing with polycyclopentyl (meth)acrylate. The index can be reduced to match the index of refraction of an embedded or intermixed rubber phase, thereby yielding a transparent, impact-resistant plastic.

There is particular interest in polymer compositions comprising about 40-99 wt. %, preferably 70-95 wt. %, of the polymer mixture, and 60-1 wt. %, preferably 30-5 wt. %, of another polymer P3, which is chemically distinguishable from polymers p1 and P2 and is incompatible with P1, P2, and the mixture.

As a rule the composition of the polymer mixture is chosen such that the index of refraction of the mixture is essentially the same as that of polymer P3, i.e. at room temperature $$|n_D{}^{25}{}_{PM} - n_D{}^{25}{}_{P3}| < 0.01.$$

As a rule, the polymer P3 which is incompatible with the mixture has a Tg <20° C., and forms covalent bonds with at least one of the components of the polymer mixture, i.e. with P1 and/or P2. Further, the polymer P3 may be crosslinked.

The case where the polymer P3 is polybutadiene or polyisoprene is highly preferred.

Polymer compositions comprised of 40-99 wt. % of the polymer mixture and 1-60 wt. % of P3 are distinguished by improved impact strength over that of the pure mixture, particularly when the Tg of P3 is <20° C.

In particular, polymer compositions comprised 40-99 wt. % of the polymer mixture and 60-1 wt. % of P3 enable one to readily prepare a high impact strength mixture containing polymer P2. Thus, by mixing a brittle P2 with a P1 of an ordinary commercially available high impact strength type (e.g. styrene-butadiene block copolymer), one can prepare a highly impact resistant, clear polymer composition containing the present polymer mixture and P3.

Such polymer mixtures containing, as polymer P2, polymers with 51-100 wt. % cyclopentyl (meth)acrylate, are of particular interest.

5) By encasing polystyrene in cyclopentyl (meth)acrylate it is possible to manufacture an optical gradient fiber. In this connection the following data were obtained:

Core: Polystyrene, with refractive index $n_D = 1.59$.

Sheath: Polycyclopentyl (meth)acrylate, with $n_D = 1.51$. As a rule, copolymers containing cyclopentyl (meth)acrylate (and, e.g., methyl methacrylate) are used for the sheath, due to the high brittleness of polycyclopentyl methacrylate; accordingly, the refractive index of the sheath is made still lower.

Transition: Continuous.

Such fibers may be used, e.g., as light-conducting cables.

6) One can produce articles comprised of polystyrene with a thin sheath or coating of polycyclopentyl (meth)acrylate, and particularly with a UV-absorber in the polycyclopentyl (meth)acrylate (which UV-absorber may be polymerized into the polymer). In contrast to polystyrene not having a sheath or coating, such articles are weather resistant. The generally serious problem of reuse of heterogeneously coated plastic wastes does not occur here, because wastes can be reprocessed, since they have good compatibility.

As a rule, articles comprised of polystyrene and of the polymer mixture are fabricated by injection molding, pressing, extruding, rolling, or ordinary molding. The sheath or coating comprised of polymer P2 is applied as a rule by painting or co-extruding.

7) Sheets comprised of polystyrene with a coating of polycyclopentyl (meth)acrylate can be manufactured. Such sheets have about 2% better light transmission than untreated polystyrene sheets. As a rule they also have better scratch resistance, and altered corrosion resistance. Particularly interesting are webbed multiple sheet structures, which can be used, e.g., as glazing for greenhouses. These are comprised of polystyrene or the polymer mixture, with a coating comprised of a polymer containing cyclopentyl (meth)acrylate (a polymer P2) (DE-A 16 09 777). Also, polystyrenes can be adhesively bonded with polymer P2 or advantageously with monomer/initiator mixtures containing cyclopentyl acrylate. In this way, the high rate of polymerization of acrylates can be combined with good polymer compatibility.

8) Processing advantages result from the use of mixtures PM comprised >90 wt. % of polystyrene and <10 wt. % of polycyclopentyl (meth)acrylate. In such cases the poly(meth)acrylate serves as a processing aid.

9) Transparent molded bodies can be obtained from mixtures of polystyrene and polycyclopentyl (meth)acrylate, wherewith by the action of energy on the surface of the bodies, e.g. by means of radiation, the surface can be modified such that the poly(meth)acrylate is degraded while the polystyrene is not degraded (e.g. molded bodies with reflection-reducing surfaces and resists).

Other features of the invention will become apparent in the course of the following descriptions exemplary embodiments which are given for illustration of the invention and are not intended to be limiting thereof.

The reduced viscosity, $\eta$, was determined according to DIN 1342, DIN 51562, and DIN 7745.

EXAMPLES

Example 1

Synthesis of polycyclopentyl methacrylate:

0.1 g t-butyl perneodecanoate, 0.1 g t-butyl peroctoate, and 0.3 g dodecylmercaptan were added to 100 g cyclopentyl methacrylate. The solution was charged into a flexible tube and was polymerized 24 hr at 40° C., followed by 24 hr at 60° C., in a water bath. This was followed by tempering 24 hr in a drying cabinet at 90° C.

After the tube was removed, the product obtained was a transparent polymer, soluble in ethyl acetate and toluene. Molecular weight of the polymer: J=43.2 ml/g.

The polymer was dissolved in toluene to form a 20% solution. Polystyrene (J=61 ml/g) was also dissolved in toluene to form a 20% solution. The solutions were then mixed, in the following ratios: 2:98, 5:95, 10:90, 20:80, 30:70, 40:60, 50:50, 60:40, 70:30, 80:20, 90:10, 95:5, 98:2. The solutions were dried to form films at room temperature, and the films were further dried 24 hr at 50° C. in a vacuum. The resulting product for all mixture ratios was a transparent film which underwent de-mixing when heated to about 220° C. (see FIG. 1).

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A compatible miscible polymer mixture, comprising two polymer components:
   A) 0.1–99.9 wt. % of a polymer P1 comprising at least 20 wt. % of monomers of formula I

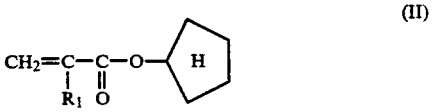

wherein $R_1$ is hydrogen or methyl, and less than 5 wt. % of polar monomers selected from the group consisting of acrylonitrile, methacrylonitrile, maleic anhydride, maleic imides, allyl alcohol, and p-(2-hydroxyhexafluoroisopropyl)styrene; and
   B) 99.9–0.1 wt. % of a polymer P2 comprising at least 10 wt. % of monomers of formula II $$CH_2=C-C-O-\langle H \rangle \quad (II)$$
$$\phantom{CH_2=C}|\phantom{-C-O} \|$$
$$\phantom{CH_2=C}R_1 \phantom{-} O$$

wherein $R_1$ is hydrogen or methyl, and the cyclopentyl group is unsubstituted or substituted with $C_{1-4}$ alkyl groups.

2. The compatible polymer mixture of claim 1, wherein polymer component P1 comprises at least 50 wt. % styrene monomer units.

3. The compatible polymer mixture of claim 1, wherein polymer component P1 comprises at least 90 wt. % styrene monomer units.

4. The compatible polymer mixture of claim 1, wherein polymer component P1 comprises at least 99 wt. % styrene monomer units.

5. The compatible polymer mixture of claim 1, wherein polymer component P2 comprises 20–0 wt. % of monomers of formula II.

6. The compatible polymer mixture of claim 1, wherein polymer component P2 comprises 51–100 wt. % of monomers of formula II.

7. The compatible polymer mixture of claim 1, wherein polymer component P2 comprises 51–100 wt. % of units of cyclopentyl (meth)acrylate.

8. The compatible polymer mixture of claim 1, wherein polymer component P2 comprises 10–90 wt. % of a $C_{1-8}$ alkyl acrylate which is not a monomer of formula II and 90–10 wt. % of monomers of formula II.

9. The compatible polymer mixture of claim 1, wherein polymer component P1 comprises 90–100 wt. % of styrene monomer units and polymer component P2 comprises 51–100 wt. % of monomers of formula II.

10. The compatible polymer mixture of claim 1, wherein polymer component P1 comprises 1–20% of a monomer of formula III

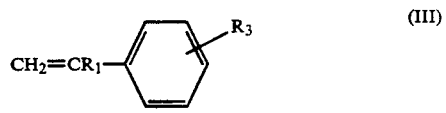

wherein $R_2$ is hydrogen or methyl, and $R_3$ is an alkyl group $C_nH_{2n+1}$, with n=1–8.

11. The compatible polymer mixture of claim 1, wherein said mixture comprises 10–99 wt. % of polymer P1 and 90–1 wt. % of polymer P2.

12. The compatible polymer mixture of claim 1, wherein said mixture comprises 50–90 wt. % of polymer P1 and 50–10 wt. % of polymer P2.

13. The compatible polymer mixture of claim 1, wherein said mixture comprises 20–80 wt. % of polymer P1 and 80–20 wt. % of polymer P2.

14. The compatible polymer mixture of claim 1, wherein at least one of polymers P1 and P2 has a glass transition temperature $T_g > 70°$ C.

15. The compatible polymer mixture of claim 1, wherein said polymer mixture has a glass transition temperature $T_g > 70°$ C.

16. The compatible polymer mixture of claim 1, wherein polymer P2 has a glass transition temperature $T_g < 40°$ C.

17. The compatible polymer mixture of claim 16, wherein polymer P2 has a glass transition temperature $T_g < 20°$ C.

18. The compatible polymer mixture of claim 1, wherein said polymer mixture has a cloud point upon heating.

19. The compatible polymer mixture of claim 1, wherein said polymer mixture has a cloud point which is $>25°$ C.

20. The compatible polymer mixture of claim 1, wherein said polymer mixture has a cloud point which is $>60°$ C.

21. The compatible polymer mixture of claim 1, wherein the polymer mixture has a cloud point which is $>180°$ C.

22. The compatible polymer mixture of claim 1, wherein the molecular weights of polymers P1 and P2 are each $>3,000$.

23. The compatible polymer mixture of claim 1, wherein at least one of the two polymers P1 and P2 has a molecular weight $>5,000$.

24. The compatible polymer mixture of claim 1, wherein at least one of the two polymers P1 and P2 has a molecular weight in the range 5,000–1,000,000.

25. The compatible polymer mixture of claim 1, wherein the molecular weights of polymers P1 and P2 are each in the range 20,000–500,000.

26. The compatible polymer mixture of claim 1, wherein the light permeability, measured on a 3 mm thick sample, is $>88\%$.

27. The compatible polymer mixture of claim 1, wherein the haze of said mixture is $<10\%$.

28. A polymer composition, comprising 40–99 wt. % of said polymer mixture of claim 1 and 60–1 wt. % of a polymer P3, which is chemically distinguishable from P1 and P2 and is not miscible with P1, P2, and said polymer mixture.

29. The polymer composition of claim 28, wherein the index of refraction of the polymer mixture at room temperature is substantially the same as the index of refraction of polymer P3 so that $$|n_D{}^{25}{}_{PM} - n_D{}^{25}{}_{P3}| < 0.01.$$

30. The polymer composition of claim 28, wherein the glass transition temperature $T_g$ of polymer P3 is $<20°$ C.

31. The polymer composition of claim 28, wherein polymer P3 is covalently bonded at least in part to polymer P1 or polymer P2.

32. The polymer composition of claim 28, wherein polymer P3 is crosslinked.

33. The polymer composition of claim 28, wherein polymer P3 is polybutadiene or polyisoprene.

34. An article comprised of the compatible polymer mixture of claim 1.

35. The article of claim 34, having a coating comprised of polymer P2.

36. The article to claim 35, wherein polymer P2 contains a UV absorbing compound in the amount of 0.1–20 wt. % based on the amount of polymer P2.

37. The article of claim 34, wherein said article is injection molded.

38. The article of claim 34, wherein said article is extruded.

39. The article of claim 34, wherein said article is a data storage sheet or plate.

40. The article of claim 34, wherein said article is an optical gradient fiber with a core comprised of polymer P1, a sheath comprised of P2, and an intermediate layer between polymers P1 and P2 comprised of said compatible polymer mixture.

41. The article of claim 34, wherein said article is a thermotropic protective glazing containing said polymer mixture according to claim 18.

42. The article of claim 34, wherein said article is a polymer film.

43. The article of claim 42, wherein said film is produced from a solvent solution of said polymer mixture.

44. The article of claim 42, wherein said film is produced from an intermixed dispersion of lattices of polymer P1 and polymer P2.

45. A solvent solution of the polymer mixture of claim 1.

46. A polymer dispersion of intermixed lattices of polymer P1 and of polymer P2 of claim 1.

47. A compatible miscible polymer mixture according to claim 1, wherein the component A contains less than 0.1 wt. % of said polar monomers.

* * * * *